United States Patent [19]

Baron

[11] Patent Number: 4,967,781
[45] Date of Patent: Nov. 6, 1990

[54] PROPORTIONAL SOLENOID VALVE

[75] Inventor: Tibor Baron, Dixon, Ill.

[73] Assignee: Borg-Warner Automotive Electronic & Mechanical Systems Corporation, Sterling Heights, Mich.

[21] Appl. No.: 333,995

[22] Filed: Apr. 5, 1989

[51] Int. Cl.$^5$ .................. G05D 16/20; F16K 31/02
[52] U.S. Cl. ........................ 137/82; 251/129.08; 251/129.21
[58] Field of Search ............... 137/82; 251/129.21, 251/129.08

[56] References Cited

U.S. PATENT DOCUMENTS

| | | |
|---|---|---|
| 850,738 | 4/1907 | Dempster . |
| 1,053,340 | 2/1913 | Ziegler . |
| 2,169,683 | 8/1939 | Dunham et al. . |
| 2,267,515 | 12/1941 | Wilcox . |
| 2,840,769 | 6/1958 | Currie . |
| 2,860,850 | 11/1958 | Rhodes et al. . |
| 2,947,284 | 8/1960 | Nicholson . |
| 3,136,220 | 6/1964 | Kamm . |
| 3,185,779 | 5/1965 | Sawyer . |
| 3,219,095 | 11/1965 | Nilsson . |
| 3,429,340 | 2/1969 | Opel et al. . |
| 3,433,256 | 3/1969 | Stillhard et al. . |
| 3,498,330 | 3/1970 | Paige . |
| 3,521,854 | 7/1970 | Leiber . |
| 3,529,620 | 9/1970 | Leiber . |
| 3,534,770 | 10/1970 | Kowalski . |
| 3,545,472 | 12/1970 | Franz . |
| 3,586,287 | 6/1971 | Knobel . |
| 3,628,767 | 12/1971 | Lombard . |
| 3,688,495 | 9/1972 | Fehler et al. . |
| 3,817,488 | 6/1974 | Mack . |
| 3,861,643 | 1/1975 | Moffatt . |
| 3,861,644 | 1/1975 | Knape . |
| 3,873,060 | 3/1975 | Espenschield et al. . |
| 3,961,644 | 6/1976 | Eckert . |
| 3,982,554 | 9/1976 | Saito et al. . |
| 4,005,733 | 2/1977 | Riddel . |
| 4,120,214 | 10/1987 | Toda et al. . |
| 4,196,751 | 4/1980 | Fischer et al. . |

(List continued on next page.)

FOREIGN PATENT DOCUMENTS

| | | |
|---|---|---|
| 1285270 | 4/1966 | Fed. Rep. of Germany . |
| 1941553 | 7/1966 | Fed. Rep. of Germany . |
| 1806040 | 10/1968 | Fed. Rep. of Germany . |
| 1179719 | 1/1970 | United Kingdom . |
| 2064720 | 6/1981 | United Kingdom . |

OTHER PUBLICATIONS

Honda Proportional Solenoid Valve, (undated).
GM Proportional Solenoid Valve (undated).
Endre A. Mayer, SAE Technical Paper Series 810464, "Electro-Pneumatic Control Valve for EGR/ATC Actuation", Feb. 23, 1981.
C. Fox, B. Blohm, "EFC Electronic Flow Controller Differential Pressure Regulator", Sep., 1984.

*Primary Examiner*—Alan Cohan
*Attorney, Agent, or Firm*—Neuman, Williams et al.

[57] ABSTRACT

An electromechanical valve apparatus has an electrical winding and a magnetic flux circuit defining a flux path therefor which includes a plurality of adjacent magnetic segments. The segments include a generally cylindrical center segment with a fluid passage, an end segment, an outer segment and a magnetic armature member. At least one of the segments is physically translatable within the valve apparatus along the flux path to adjust a portion of one of the magnetic segments that is in the flux path and the extent of an air gap adjacent the translatable segment. The apparatus includes a non-magnetic seat member which is located near or at the point of highest flux density along the longitudinal axis through the electrical winding. The armature is preferably an elongated cup member with its closed end located within the electrical winding near the non-magnetic seat member. The seat member and armature are enclosed within a chamber defining body such as the bobbin. In an alternative embodiment, a flat disc member is located at the base of the armature. The flat disc is retained within the base of the armature. When no current is flowing in the winding, the flat disc member rests against an armature seat formed in the chamber defining body and prevents leakage of air from the fluid chamber.

38 Claims, 3 Drawing Sheets

U.S. PATENT DOCUMENTS

| | | |
|---|---|---|
| 4,251,052 | 2/1981 | Hertfelder et al. . |
| 4,258,749 | 3/1981 | Mayer . |
| 4,285,603 | 8/1981 | Bernardis et al. . |
| 4,299,374 | 11/1981 | Yamanaka . |
| 4,304,391 | 12/1981 | Yamaguchi . |
| 4,337,794 | 7/1982 | Yamanaka . |
| 4,386,626 | 6/1983 | Hehl . |
| 4,419,642 | 12/1983 | Kramer et al. . |
| 4,522,371 | 6/1985 | Fox et al. . |
| 4,524,948 | 6/1985 | Hall . |
| 4,534,375 | 8/1985 | Fox . |
| 4,567,910 | 2/1986 | Slavin et al. . |
| 4,601,277 | 7/1986 | Cook . |
| 4,715,396 | 12/1987 | Fox . |
| 4,729,397 | 3/1988 | Bruss .......................... 251/129.21 X |
| 4,846,439 | 7/1989 | Suzuki ......................... 251/129.21 X |

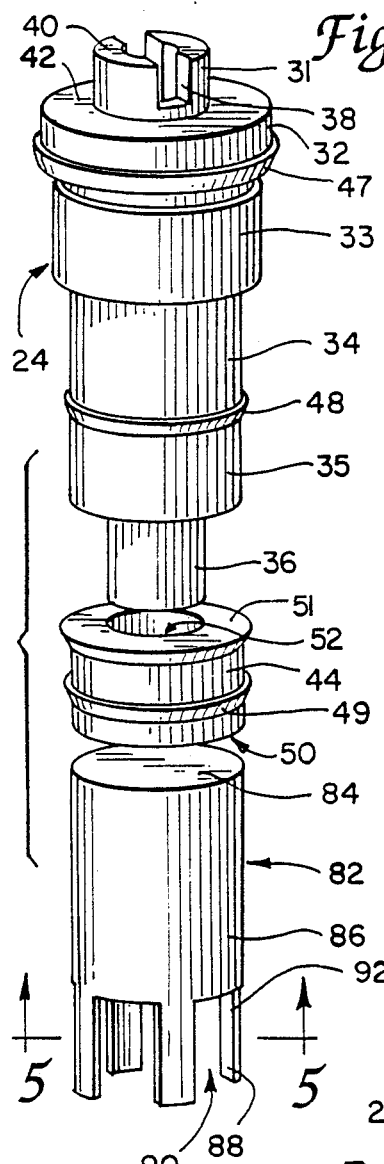
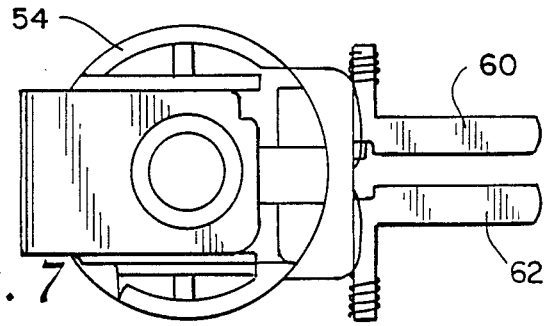
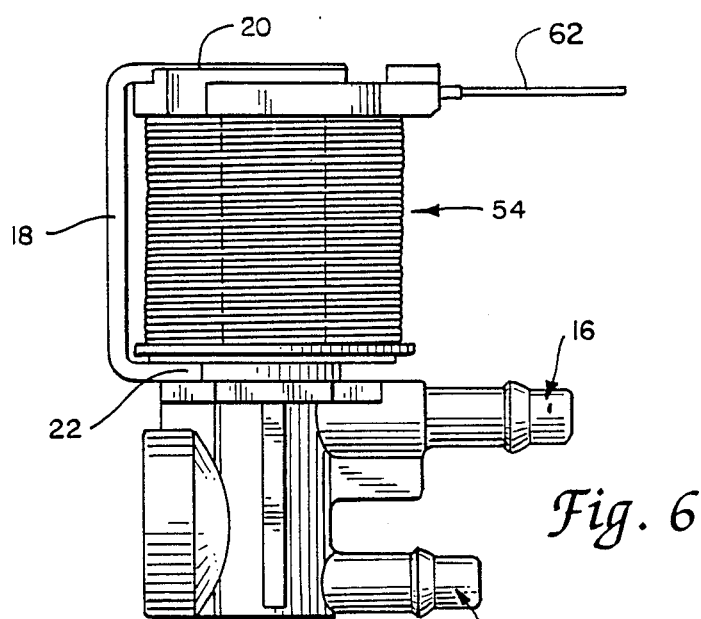
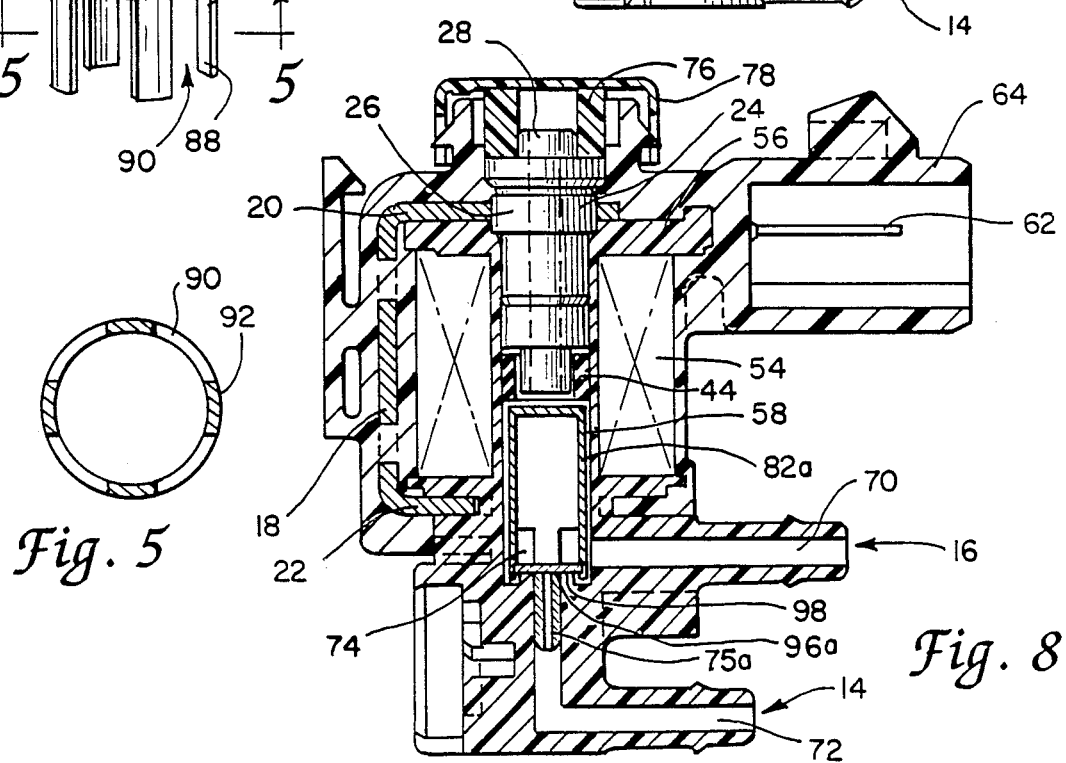

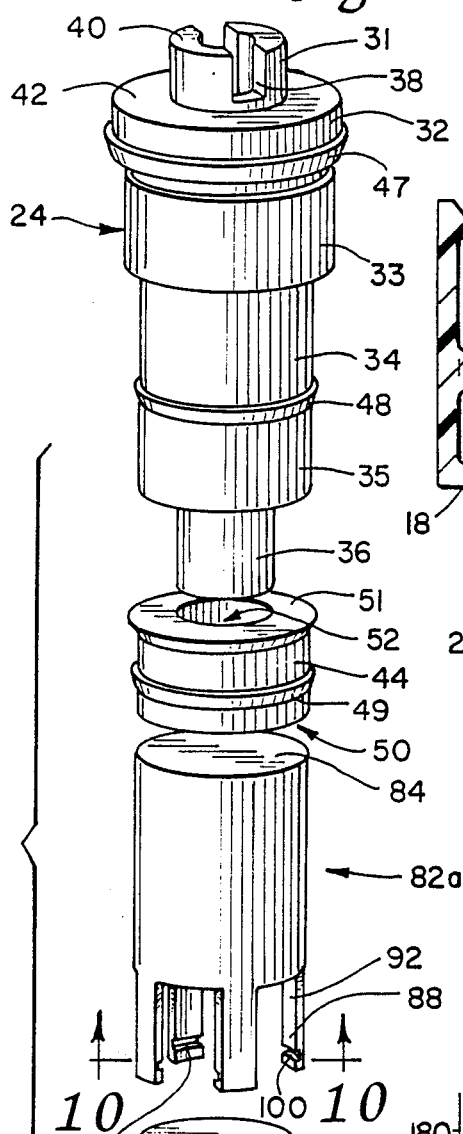
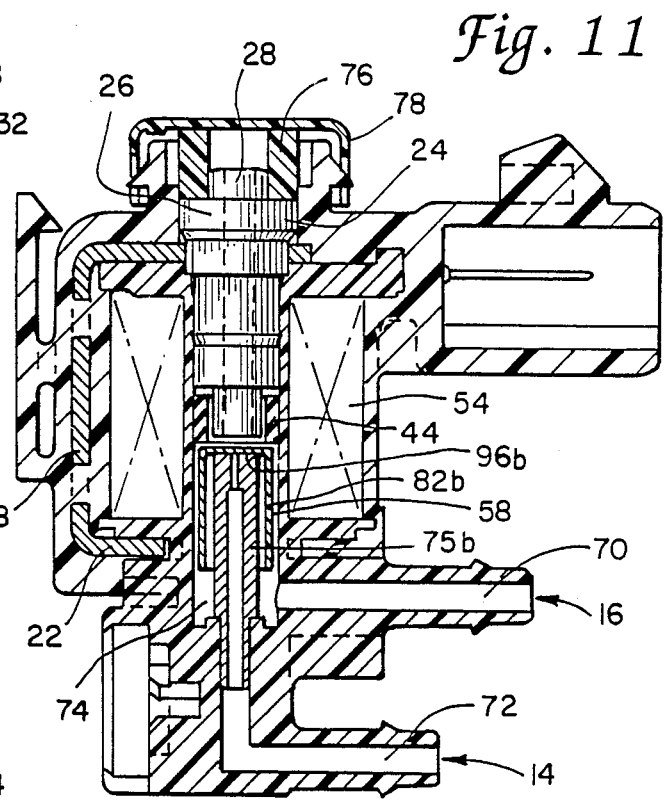
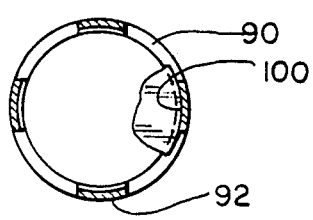
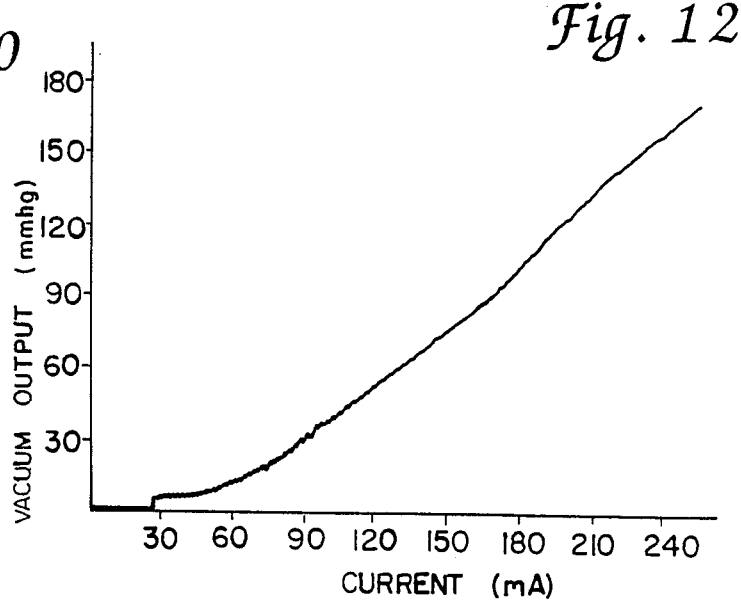

PROPORTIONAL SOLENOID VALVE

Reference is made to the subject matter of U.S. Pat. Nos. 4,534,375 and 4,715,396, each issued to Clarence D. Fox for a "Proportional Solenoid Valve". The present invention is a new approach to valves of that type.

BACKGROUND OF THE INVENTION

1. Field of the Invention

The present invention relates to proportional solenoid valves and, more particularly, to a proportional solenoid valve which utilizes an elongated cup armature and non-magnetic seat located near the region of highest flux density, and provides zero bias, that is, substantially zero differential pressure when no current is present in the electric winding of the solenoid.

2. Description of the Prior Art

A variety of solenoid valves have been developed in which electromagnetics are utilized in an attempt to control either hydraulic or pneumatic flow. Typically, such valves attempt to regulate the flow of fluid in an on-off fashion. Where modulation is desired, two valves are frequently used in a timed, alternating operation to provide an output which is a function of the timing and the two inputs.

This same type of modulation has also been accomplished with a single device where the armature of the valve actuated between two oppositely disposed seats to permit a mixture of fluid at atmospheric pressure and fluid at a higher or lower pressure. In such a valve, a large mass iron armature is spring-biased against a first seat and utilized to prevent fluid flow through the seat. When in this position, fluid at atmospheric pressure is allowed to enter the valve through a second seat. At appropriate times, current is supplied to an electromagnetic winding and the spring force against the armature is overcome by the magnetic flux and the armature traverses an air gap until it contacts the second seat, located on the opposite side of the valve. When the armature contacts the second seat, fluid at atmospheric pressure is prevented from entering the valve through the second seat. Fluid at either a high pressure (above atmospheric) or a vacuum (below atmospheric) source is permitted to enter the valve through the first seat.

At a later time in the cycle, the current is reduced in the winding and the solenoid is de-energized, allowing the spring force to overcome any hysteresis effects on the armature and cause the armature to travel back across the air gap to the first seat. This prevents flow from the high pressure fluid source or the vacuum fluid source through the first seat and allows fluid at atmospheric pressure to enter the valve through the second seat. In this on-off fashion, the armature alternatively and periodically allows fluid to enter the valve through the first seat and the second seat. By applying a controlled duty cycle to alternately open and close the inlets through the first and second seats, the valve attempts to provide the approximation of a desired outlet pressure. Such valves, however, are not able to provide adequate speed or control of the output pressure through this on-off electronic adjustability and fail to provide a linear relationship between the current input to the winding and the differential pressure output from the valve. Such systems often require feed-back or closed loop operation.

Some of these prior art valves utilize complex assemblies that operate in conjunction with ball valves. Other types of these prior art valves utilize flapper-type valves that attempt to balance the electromagnetics against fluid blast or fluid flow.

Many of the disadvantages and complexities of these prior art solenoid valves were eliminated with the development of the proportional solenoid valves of U.S. Pat. Nos. 4,534,375 and 4,715,396. The development of the aforementioned proportional solenoid valves provided a mechanism for modulating the differential pressure in a chamber by varying the energization level of the electrical winding in an electromagnetic assembly between a vacuum source and ambient. This valve included a restriction in the fluid conduit between the vacuum source and the differential pressure chamber. Such a restriction substantially reduced the fluid flow required for actuation. The large mass armature of the prior art valves was replaced by a low-mass armature which provided quick response and resulted in proportional control and a near linear relationship between current input to the electrical winding and output differential pressure.

The proportional solenoid valve development also provided a valve which allowed adjustment of one of the segments in a series of segments in a magnetic flux circuit. The adjustment of a segment allowed a variation of the set point of the current versus differential pressure curve. The result was greatly improved control over the current versus differential pressure relationship. It also generally eliminated any requirement of feed-back or closed loop operation for calibration.

The zero bias proportional solenoid valve of the present invention provides a new approach to proportional solenoid valves. The valve of the present invention provides a valve having quick response and repeatability by locating the non-magnetic seat nearer to the point of highest flux density but between the point of highest flux density and the armature. Moreover, the utilization of an elongated armature with a flat disc member at its base, or a flat portion to contact the opening to the vacuum source, provides a more efficient valve with a zero bias, that is, the substantial elimination of leakage of fluid from the vacuum source when the valve is without current in the electric winding of the solenoid.

OBJECTS OF THIS INVENTION

Accordingly, it is an object of this invention to provide a proportional solenoid valve which better utilizes the efficiencies associated with the region of highest flux density of the flux circuit.

It is a specific object of this invention to provide a proportional solenoid valve with a non-magnetic seat and portion of the armature with the seat located within the center of the winding in the region of highest flux density of the flux circuit.

It is one specific object of this invention to provide a proportional solenoid valve which includes an armature configured to provide zero differential pressure at zero current.

It is another object of this invention to provide a method of manufacturing a proportional solenoid valve which meets the aforestated objects and which minimizes the expense of manufacture.

It is another object of this invention to provide a proportional solenoid valve which meets the aforestated objects and optimizes the speed of response and output force while maintaining the low-flow characteristics of the proportional solenoid valve.

Other objects, advantages and features of the present invention will become apparent upon reading the following detailed description and appended claims, and upon reference to the accompanying drawings.

SUMMARY OF THE INVENTION

In accordance with one embodiment of this invention, an electromechanical valve apparatus has an electrical winding and a magnetic flux circuit therefor defining a flux path which includes a plurality of adjacent magnetic segments. The segments include a generally cylindrical center segment, an outer segment and an end segment. The end segment is adjacent one end of a fluid passage which is defined at least in part by the center segment. At least one of the segments is physically translatable within the valve apparatus relative to the flux path to adjust a portion of one of the magnetic segments that is in the flux path and the extent of an air gap adjacent the translatable segment. Physically translatable means any adjustment, rotation, translation, motion or alteration of motion which will accomplish the objects of this invention. The term "air gap" in this context may include any non-magnetic gap in the flux path comprising air, non-magnetic solids or a combination thereof.

The apparatus includes a non-magnetic seat member which has a central opening aligned with and disposed near the output end of the fluid passage. The seat member is preferably located substantially near the center of the vertical or longitudinal axis through the center of a bobbin or other support for the electrical winding. The apparatus also includes a magnetic closure member which is positioned adjacent the non-magnetic seat and effectively displaced from the location of maximum flux may form the center segment. The closure member comprises one of the magnetic segments and completes the flux path. The opening provided by the seat and closure member communicates with a differential pressure chamber such that a predetermined pressure difference in the chamber can be modulated by varying the energization level of the electrical winding. Translation of the adjustable segment along the flux path is effective to vary the reluctance of the flux path and air gap distance, to correspondingly adjust the response of the valve apparatus for a given energization level of the electrical winding to provide a given pressure difference. This is an adjustment normally made at the time of manufacture, thus eliminating need for subsequent calibration or closed loop operation.

The apparatus of this invention includes a chamber which encloses or is partially defined by the non-magnetic seat member and at least a portion of the magnetic closure member, or armature. The chamber is preferably defined, at least in part, by a wall which is cylindrical and constrains the motion of the armature substantially parallel to the longitudinal axis of the flux source and preferably includes a bobbin which supports the electrical winding. The armature is preferably a low mass elongated cup member. The armature includes a flat end portion and an elongated wall portion which terminates in a base portion. Notches are formed in the wall member, near the base, to permit fluid flow through the base of the armature.

Another embodiment of the valve apparatus includes a flat disc member at the base of the armature. The flat disc member is retained within the armature by a series of indentations. When no current is flowing in the winding, the flat disc member rests against an armature seat and prevents leakage of air into or out of the differential pressure chamber. In another embodiment, an orifice restriction is located within the armature seat. In another embodiment, the armature may be configured to have its end portion contact the armature seat and prevent flow between the vacuum source and the differential pressure chamber.

BRIEF DESCRIPTION OF THE DRAWINGS

For a more complete understanding of this invention, one should refer to the embodiments illustrated in greater detail in the accompanying drawings and described below by way of examples of the invention. In the drawings:

FIG. 4 is an exploded perspective view of several elements of the flux circuit;

FIG. 5 is a sectional view taken along line 5—5 of FIG. 4;

FIG. 6 is a side elevation view of the inner portions of the valve of the present invention;

FIG. 7 is a top plan view of the valve portion shown in FIG. 6;

FIG. 8 is a side elevation view of an alternate embodiment of the present invention having a flat disc member at the base of the armature;

FIG. 9 is an exploded perspective view of several elements of the magnetic flux circuit of the embodiment of FIG. 8;

FIG. 10 is a sectional view taken along line 10—10 of FIG. 9 with a portion broken away;

FIG. 11 is a side elevation view of an alternate embodiment of the present invention having the end portion of the armature structured to contact the armature seat; and, FIG. 12 graphically illustrates a plot of empirical data for pressure differential as a function of current.

DETAILED DESCRIPTION OF THE DRAWINGS

Figure 2:
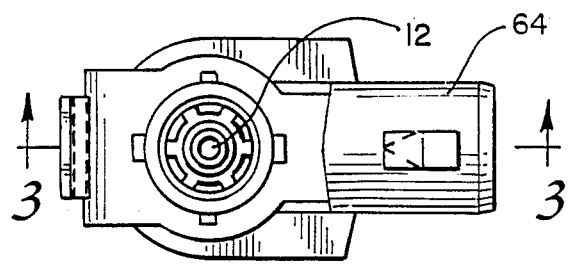
FIG. 2 is a top plan view of the proportional solenoid valve of the present invention.
Figure 1:
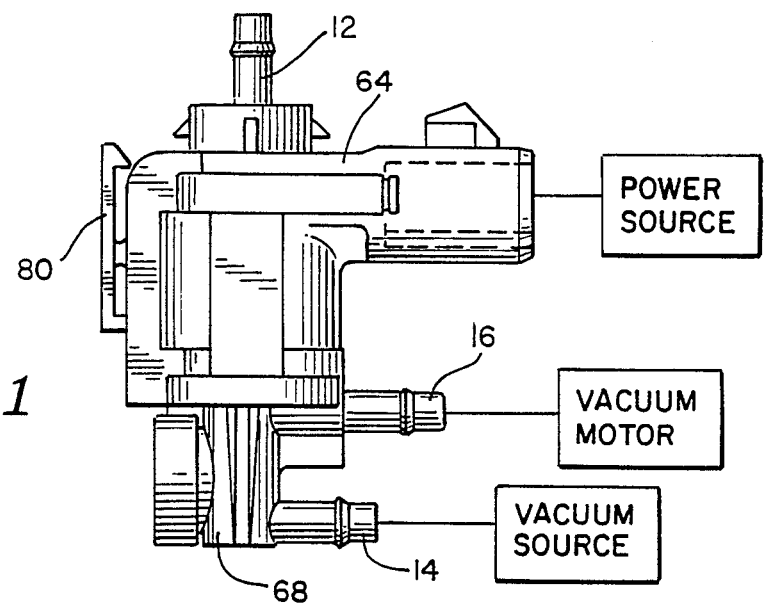
FIG. 1 is a side elevation view of the proportional solenoid valve of the present invention.

Turning now to the drawings, FIGS. 1 and 2 show an electromechanical valve apparatus generally at 10. The valve apparatus, in the illustrated preferred embodiment, has a top port 12 for the inlet of fluid at atmospheric pressure to the valve, and port 14 for the application of fluid from or to a vacuum (below atmospheric pressure) source. Outlet port 16 provides a means for accessing the differential pressure inside the valve apparatus. The means for accessing pressure can be utilized to operate a vacuum motor or a diaphragm operated assembly or any other type of pressure responsive device.

Figure 3:
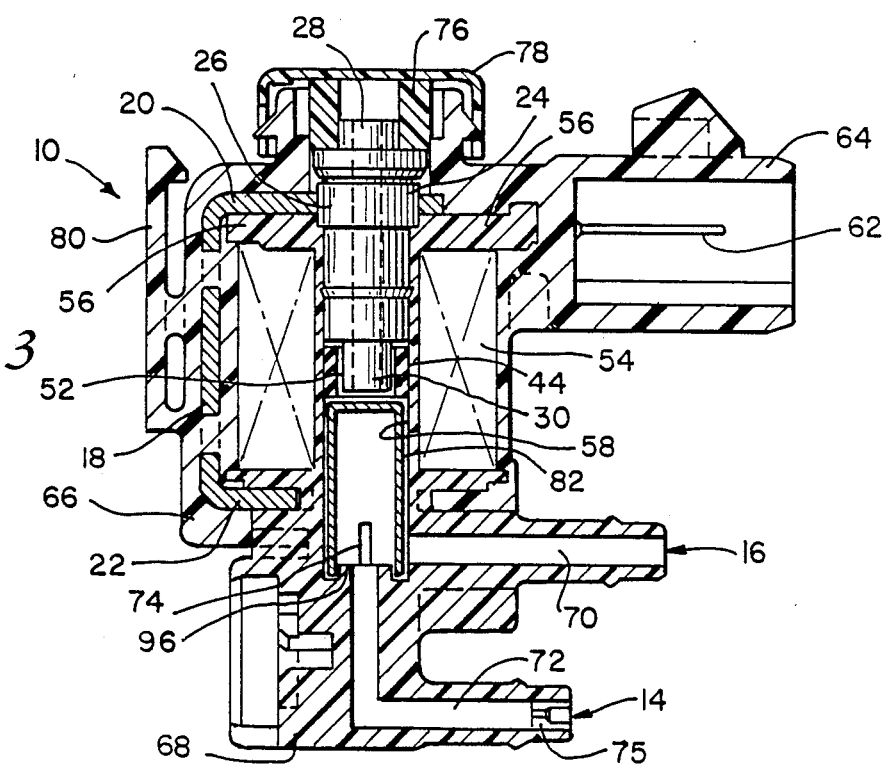
FIG. 3 is a side sectional view taken along the line 3—3 of FIG. 2, which shows the magnetic flux circuit.

The electromechanical valve apparatus, as shown in more detail in FIG. 3, includes a plurality of adjacent magnetic segments which act to define a magnetic flux circuit with a flux path. The segments include an iron outer member or mounting bracket 18, having two end portions which are preferably a top portion 20 and a bottom portion 22. Also in the flux circuit is a generally cylindrically center member 24. The center member has a hollow passageway to define a fluid passage 26 with an inlet port 28 and an output port 30. The center member is of iron or other ferromagnetic material.

The center member is shown in more detail in FIG. 4. The center member is formed of a plurality of cylindrical portions or sections 31, 32, 33, 34, 35, 36. The inner portions 32, 33, 34, 35 are preferably connected in a stepped or tapered relationship. The first end portion or top portion 31 of the center member is also cylindrical and includes a slot 38 running across its midsection. The slot 38 extends from the upper surface 40 of the top portion 31 to the upper surface 42 of inner section 32. This slot serves to allow greater flow of fluid into the center member of the valve.

The second end portion or bottom portion 36 of the center member is also of cylindrical construction and is preferably of a diameter sufficient to allow sliding along a vertical axis within the inside of a round non-magnetic seat member 44. The center member contains ribs 47, 48 and the non-magnetic seat member contains ribs 49 to allow an interference fit within the valve assembly. The non-magnetic seat 44 includes a lower face 50 and an upper face 51. The seat 44 also includes a passageway or aperture 52 through its center. The bottom portion 36 of the center member slides along a vertical axis within this passageway 52 of the non-magnetic seat 44.

An electrical winding 54, shown more clearly in FIG. 6, is mounted about the center member and non-magnetic seat. The seat is preferably located near the center of the vertical axis of the winding. The winding 54 is encased on its upper, lower and inner diameter surfaces in a bobbin 56 which is generally of plastic, or non-magnetic material. The bobbin forms a cylindrical chamber 58 which is utilized to contain the center member and non-magnetic seat. The center member 24 is adjustable or translatable along the vertical axis of the winding to abut the upper face 51 of the non-magnetic seat or to move to a position above the non-magnetic seat.

The electric winding is connected to a pair of terminals 60, 62, shown in FIG. 7. The terminals are connected to a suitable power supply which can supply an electric current to the winding 54. The power supply can be a direct current source, a square wave generator, a variable resistor, a pulse width modulation circuit, or an automobile on-board computer functioning as a signal source.

The terminals 60, 62 and bobbin 56 are maintained in operative relationship by housing 64. The housing 64, preferably formed of plastic, provides a structural support for the bobbin and center member above the bobbin. The housing has a lateral portion 66 which extends around the outer member 18 and forms a support and covering for the outer member. The housing also has a base portion 68 into which two conduits are formed. A first fluid conduit 70 ends in port 16. The second fluid conduit 72 ends in port 14. The two conduits 70, 72 intersect in fluid chamber 74.

A restriction or orifice 75 is provided in the second conduit 72. The restriction 75 is located near the port 14 and acts to limit the fluid flow within the valve assembly. The restriction is of cross sectional area which is substantially smaller than the cross sectional area of the fluid passage 26 through the center member.

Above the center member 24 is a filter 76 which fits around the top portion 31 of the center member. The filter acts to prevent materials from improperly entering the valve apparatus. Above the filter is a cap 78 which is removable from the housing 64 to allow adjustment of the inside pieces of the valve. A clip 80 is also formed in the housing 64 to permit mounting or other retention of the valve apparatus.

Beneath the non-magnetic seat is the magnetic closure member or armature member 82. As shown in FIGS. 4 and 5, the armature is preferably an elongated cup member having a flat top or end portion 84 and a wall member 86. The wall member depends from the end portion 84 to a base portion 88. Notches 90 are provided in the wall member near the base 88 to form a plurality of legs 92. In the preferred embodiment, the armature has four legs. The wall member defines a hollow inner portion of the armature. This hollow inner portion provides a fluid chamber or differential pressure chamber 74, which is shown in FIG. 8. The differential pressure chamber is operatively connected to the first and second fluid conduits 70, 72, to allow fluid flow. The armature rests or seats against armature seat member 96. The armature seat member 96 is integrally formed in the base portion 68 of the housing. The use of an elongated armature member eliminates the need for a spring member to keep the armature in an operating position, as required in prior art solenoid valves.

Generally, the seat 44 is of a soft material such as brass and the armature is of a harder material such as iron or steel such that the combination of a soft material touching a harder material produces a superior seal. The seat may also be of a hard material such as non-magnetic stainless steel or plastic.

An alternative embodiment of the armature is shown in FIGS. 8, 9 and 10. In this embodiment, the armature member 82a includes a flat disc member 98. The flat disc member is retained within the base portion 88a of the armature 82a by a plurality of indentations 100, 102 along the base portion of the armature. The flat disc member is annular in shape and is retained within the indentations in a secure, but non-tight fit.

In the alternative embodiment of FIG. 9, the restriction or orifice 75a of the second conduit is placed immediately below the base portion of the armature 82a. In this location, the orifice 75a serves as an armature seat member 96a. The seal between the flat disc member 98 and the orifice 75a is sufficient to prevent leakage of fluid from the second conduit member into the fluid chamber 94 when the armature is in the rest position against the armature seat 96a.

Another alternative embodiment of the valve is shown in FIG. 11. In this embodiment, the armature member 82b is shortened in length. The armature preferably extends at least beyond the end of the outer member in order to complete the magnetic flux circuit. Notches in the base of the armature member are not necessary in this embodiment.

In this embodiment, the flat disc member is eliminated. In its place, the restriction or orifice 75b is extended within the armature 82b. This places the armature seat member 96b within the inside of the armature member 82b. The seal between the end portion 84 of the armature 82b and the orifice 75b is sufficient to prevent leakage of fluid from the second conduit member into the fluid chamber when the armature is in the rest position against the armature seat 96b. The prevention of leakage provides the zero bias feature of the present invention. The extension of the armature seat into the armature need not include the orifice. That is, the armature seat can be extended while the orifice is maintained at a location near the port 14.

In all three embodiments, the flat top portion 84 of the armature 82 acts against the opening in the lower face 50 of the non-magnetic seat member 44. The armature acts at various positions between and including a fully closed position, in which the armature is seated against the non-magnetic seat 44, and a fully open position, in which the armature 82 is at its lowest possible position in the cylindrical chamber 58 and resting against the armature seat 96. The opening of the armature by its movement in the vertically downward direction allows fluid flow through the fluid passage 26 and non-magnetic seat 44 and around the outside of the wall member 86 of the armature through cylindrical chamber 58 and into the fluid chamber 74. The downward movement of the armature thus creates a fluid opening defined between the lower face 50 of the non-magnetic seat and the flat top portion 84 of the armature. Fluid in the fluid chamber 74 is accessed by the first and second conduits 70, 72.

The cross sectional diameter of the fluid passage 26 is preferably on the order of 0.100 inch. The cross sectional inner diameter of the non-magnetic seat member is preferably on the order of 0.200 inch. These diameters are substantially larger than the cross sectional diameter of the orifice 75 which is preferably on the order of 0.020 inch.

As described above, the non-magnetic seat member 44 is preferably located near the center of the vertical axis of the electric winding 54 which is near the point of highest flux density of the winding. The armature is therefore also located near this same point of high flux density. The wall portion of the armature preferably extends down from this center point in order to complete the flux circuit. That length is at least to the point of the bottom 22 of the outer member 18.

The center member 24 is slidable within the cylindrical chamber 58. Translation of the center member in the vertical direction is effective to alter the distance of an air gap between the underside of the bottom portion 36 of the center member and the top flat portion 84 of the armature. Alteration of this air gap distance changes the reluctance of the magnetic flux circuit of the center member, armature and outer member. The center member can be retained in its translated position by the ribs 47 and 48 which are in interference fit with the inside of the bobbin 56. Access to the center member is possible through removable cap 78. Once the proper location of the center member is attained, the center member may be secured in place by any means known in the art such as welding or the use of an encapsulate.

In operation, the magnetic closure member or armature 82 is rapidly responsive to an induced magnetic flux from a current passed through the electrical winding. A magnetic flux is produced by the winding in the magnetic flux circuit of the center member, armature, outer member, and the air gap between the armature and the center member. When a current is passed through the winding, the armature 82 is drawn toward seat 44. When the current is interrupted, the armature falls, by gravity and the force of the fluid through the center member, toward the armature seat 96.

When a pressure lower than atmosphere (i.e., a vacuum) is imposed at port 14, the vacuum condition is communicated to fluid chamber 74 through the orifice restriction 75 and fluid conduit 72. A differential pressure is created in the fluid chamber 74 by the flow of fluid at atmospheric pressure in through the center member inlet port 28, the fluid passage 26 and out through the center member output port 30. The fluid continues through the passageway 52 in the non-magnetic seat 44, the fluid opening created between the seat 44 and the armature 82, and along the outside of the wall member of the armature in the cylindrical chamber 58 through the notches 90 of the armature and into the fluid chamber 74. The different pressure in the fluid chamber is accessed through fluid conduit 70 and port 16.

The pressure differential in the fluid chamber 74 is altered by movement of the armature in response to varying the energization level of the current in the electrical winding. This armature movement changes the amount of communication of fluid at atmospheric pressure with the fluid chamber. Energization of the electrical winding attracts the armature toward the center member, overcoming the forces of gravity and the fluid flow through the fluid opening in the seat. The upward movement of the armature is limited by the non-magnetic seat.

An empirical illustration of the change of the pressure differential (vacuum in inches of mercury) as a function of the current in milliamperes for the invention is shown in FIG. 12. This data is only representative of a sample plot with one embodiment of the solenoid valve of the present invention and is not intended to demonstrate any particular results other than the generally expected behavior of the valves of the present invention.

Translation of the center member of the valve apparatus along the flux path alters the portion of the center segment that is in the flux path. Such translation also varies the air gap distance between the armature and the center member and therefore alters the reluctance of the flux circuit. The center member is thus translated along the vertical axis to find the appropriate set point for operation of the valve. Once this set point is found, the center member is fixed in that position and the valve is operated along the current versus pressure differential curve for that set point.

In operation, the armature moves vertically within the chamber formed by the bobbin. The flow of fluid around the outside of the wall member of the armature serves as a sleeve for the travel of the armature. The utilization of the flow restriction or orifice 75 results in the low flow characteristics of the valve and a limitation of movement of the armature to provide changes in the differential pressure in the fluid chamber.

Utilization of the flat disc member 98 at the base of the armature against an armature seat 96 prevents leakage of fluid from the vacuum source into the chamber when the armature is in the rest position against the armature seat and the current is removed. This provides the zero bias characteristics of the present valve, that is, the zero output pressure differential at a condition of zero current. This relationship is shown in the graph of FIG. 11. Moreover, location of the orifice 75a at the point of the armature seat 96 below the flat disc member 98 reduces the hysteresis effects. This is a result of the smaller fluid conduit at that point.

The location of the seat member 44 at or near the point of highest flux density within the electrical winding provides greater control and repeatability of the pressure differential versus current characteristics of the present valve. Providing the air gap between the armature and the center member at or near this point of highest flux density provides a more efficient and responsive valve. This also allows the use of a lower mass armature. However, the wall portion of the armature must be of appropriate length so that the armature remains in the flux path for all operating positions of the armature; that is, the armature wall portion must extend at least to the bottom of the outer member for all operating positions of the armature.

The valve is manufactured by assembling the magnetic segments to form a magnetic flux circuit. The armature is first inserted into the valve from the top and allowed to rest against the armature seat on the base of the housing. The non-magnetic seat 44 is then driven into the center of the chamber defined by the bobbin. The non-magnetic seat is preferably located as near as possible to the midpoint of the longitudinal axis running through the center of the electrical winding, i.e., the point of highest flux density. Ribs along the seat provide the interference fit necessary to hold the seat in position.

The center member is then driven into the center of the valve and above the seat. A current is applied to the winding and a vacuum source is connected to the vacuum source port 14. The differential pressure in the fluid chamber is accessed and measured through port 16. The center member is driven further into the valve center and measurements taken until the proper set point of output differential pressure for a given vacuum pressure is reached. At that point, the location of the center member is further secured by welding or other appropriate means and the remainder of the valve is assembled with the filter and cap placed on the top of the center member.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. An electromechanical valve apparatus, comprising:
   an electrical winding having an axial length;
   a magnetic flux circuit for said winding defining a flux path comprising a plurality of adjacent magnetic segments, including a generally cylindrical center segment extending over a portion of said axial length which defines a fluid passage, an outer segment and an end segment adjacent a first end of said fluid passage;
   at least one of said segments being physically translatable within said valve apparatus along said flux path to adjust a portion of one of said segments that is in said flux path and the extent of an air gap adjacent the translatable segment;
   annular non-magnetic seat means having a central opening aligned with and disposed near the other end of the fluid passage within said axial length;
   magnetic closure means comprising one of said segments, positioned adjacent the non-magnetic seat means and movable along said axial length, said closure means completing the flux path such that fluid flow urged by a predetermined pressure difference through the fluid passage and seat means central opening can be modulated by varying the energization level of the electrical winding; and,
   means defining a chamber having a cylindrical portion adjacent said seat means to enclose said magnetic closure means and to constrain the motion of said magnetic closure means substantially parallel to said axial length, said closure means being at least partially within said axial length and movable between a position against said seat means and a position displaced therefrom.

2. The electromechanical valve apparatus of claim 1 wherein said magnetic closure means has wall portions generally parallel to said axial length and said chamber has corresponding wall means to constrain said closure means.

3. The electromechanical valve apparatus of claim 1 including a bobbin, said electrical winding being formed on said bobbin and said bobbin supporting said center segment and said non-magnetic seat means.

4. The electromechanical valve apparatus of claim 3 wherein said bobbin also defines chamber wall means for constraining said magnetic closure means.

5. The electromechanical valve apparatus of claim 4 wherein said center segment and said non-magnetic seat means are relatively movable in said bobbin whereby the air gap between said center segment and said closure means can be effectively adjusted.

6. The electromechanical valve apparatus of claim 3 wherein said bobbin is a part of a valve housing which includes an outlet port for said chamber and an access port for sensing the pressure in said chamber, said outlet port including a flow restricting means.

7. The electromechanical valve apparatus of claim 1 wherein there is sufficient clearance between said closure means and the means defining said chamber to permit relatively unrestrained fluid passage therebetween.

8. The electromechanical valve apparatus of claim 1 including a second end segment extending toward the central axis of said electrical winding adjacent said magnetic closure means.

9. The electromechanical valve apparatus of claim 8 wherein only an axial portion of said magnetic closure means is in said magnetic flux circuit.

10. The electromechanical valve apparatus of claim 9 wherein the portion of said magnetic closure means in said flux circuit is variable depending upon the energization of said winding and the relative positioning of said center segment and said non-magnetic seat means.

11. The electromechanical valve apparatus of claim 5 wherein said center segment has a portion extending into said seat means to minimize said air gap.

12. The electromechanical valve apparatus of claim 11 wherein a portion of said cylindrical chamber means has an extension into said magnetic closure means to limit the motion of said closure means away from said non-magnetic seat means.

13. The electromechanical valve apparatus of claim 1 wherein said non-magnetic seat means is located in the central region of said axial length.

14. The electromechanical valve apparatus of claim 1 wherein said magnetic closure means is a generally elongate cup means with the end portion thereof adjacent said non-magnetic seat means.

15. An electromechanical valve apparatus, comprising:
   an electrical winding having an axial length;
   a magnetic flux circuit magnetically coupled to said winding and defining a flux path, said circuit comprising a plurality of adjacent magnetic segments, including a generally cylindrical center segment which defines a fluid passage, an outer segment and an end segment adjacent an input end of said fluid passage;
   an annular non-magnetic seat member, having a central opening aligned with and disposed about the output end of said fluid passage and extending beyond the center segment, said opening defining an area for the exertion of pressure;

a magnetic closure member, positioned adjacent the non-magnetic seat member, adapted to substantially cover said central opening;

said center member having physically translatable within said valve apparatus along said flux path to adjust a portion of said center member that is in said flux path and the extent of an air gap between said output end of the center member and said magnetic closure member;

means defining a bobbin adjacent said non-magnetic seat member to enclose said seat member and at least a portion of said magnetic closure member within said axial length and to constrain the motion of said magnetic closure member substantially parallel to the longitudinal axis of said fluid passage between a position against said annular seat member and a position displaced therefrom; and bobbin means substantially enclosing said electrical winding; and said magnetic closure member with said magnetic segments, completing the flux path such that fluid flow urged by a predetermined pressure difference through the fluid passage and seat member central opening can be modulated by varying the energization level of the electrical winding, translation of the center member along said flux path being effective to vary said portion of said center member in said flux path and regulate the air gap distance between said center member and said closure member and thus vary the reluctance of the flux circuit, to correspondingly adjust the response of the valve apparatus for a given energization level of the electrical winding to provide a given pressure difference.

16. The electromechanical valve apparatus of claim 15 wherein said magnetic closure member is a generally elongate cup member.

17. The electromechanical valve apparatus of claim 15 wherein said magnetic closure member is positioned within said cylindrical chamber means to define a fluid passageway between said closure member and said cylindrical chamber means.

18. The electromechanical valve apparatus of claim 15 wherein said center member further comprises a plurality of cylindrical portions, including a first end portion and a second end portion.

19. The electromechanical valve apparatus of claim 18 wherein said center member second end portion is translatable to a position near said central opening of said non-magnetic seat member.

20. An electromechanical valve apparatus, comprising:

an electrical winding;

a magnetic flux circuit defining a flux path for said winding comprising a plurality of adjacent magnetic segments, including a generally cylindrical center segment which defines a fluid passage, an outer segment and an end segment adjacent a first end of said fluid passage;

an annular non-magnetic seat member, having a central opening aligned with and disposed near the other end of the fluid passage;

magnetic closure means positioned adjacent the magnetic seat and, with said magnetic segments, completing the flux path such that fluid flow urged by a predetermined pressure difference through the fluid passage and seat member central opening can be modulated by varying the energization level of the electrical winding, said closure means defining an annular closure surface generally normal to the axis of said fluid passage, at least one of said segments being physically translatable within said valve apparatus along said flux path to adjust a portion of one of said segments that is in said flux path and the extent of an air gap adjacent the translatable segment;

translation of the adjustable segment along said flux path being effective to vary said portion of one of said segments in said flux path and the air gap distance and thus vary the reluctance of the flux circuit, to correspondingly adjust the response of the valve apparatus for a given energization level of the electrical winding to provide a given pressure difference;

means defining a chamber having a cylidrical portion adjacent said non-magnetic seat member to receive said seat member and a portion of said magnetic closure means and to constrain the motion of said magnetic closure means substantially parallel to the longitudinal axis of said fluid passage between a position against said annular seat member and a position displaced therefrom; said cylindrical chamber means including bobbin means to support said electrical winding;

said magnetic closure means being a generally elongate cup member having a substantially flat end member, a generally cylindrical wall member and a base portion, said wall member depending from said end member to said base portion; a flat disc member disposed along said cup member base portion;

means defining a fluid chamber communicating with said fluid passage through said central opening, fluid conduit means having a first end extending from said fluid chamber whereby a differential fluid pressure can be applied between said other end of said fluid passage and the other end of said fluid conduit means;

means for accessing the relative pressure in said fluid chamber; and, restriction means in said fluid conduit means restricting the flow therethrough, said restriction means having an effective cross sectional area less than the cross sectional areas of said fluid conduit means and said fluid passage and said fluid opening for operating positions of said closure means.

21. The electromechanical valve apparatus of claim 20 wherein said flat disc member is operatively disposed near said first end of said fluid conduit means to prevent flow through said first end of said fluid conduit means for energization of said winding less than a predetermined minimum.

22. The electromechanical valve apparatus of claim 21 wherein said restriction means comprises an armature seat member in said first end of said fluid conduit means.

23. An electromechanical valve apparatus, comprising:

an electrical winding having an axial length;

a magnetic flux circuit for said winding defining a flux path comprising a plurality of adjacent magnetic segments, including a generally cylindrical center segment extending over a portion of said axial length which defines a fluid passage, an outer segment and an end segment adjacent a first end of said fluid passage;

first annular non-magnetic seat means having a central opening aligned with and disposed near the other end of the fluid passage within said axial length;

magnetic closure means comprising one of said segments and positioned adjacent to and axially movable relative to the first non-magnetic seat means, said closure means completing the flux path such that fluid flow urged by a predetermined pressure difference through the fluid passage and first non-magnetic seat means central opening can be modulated by varying the energization level of the electrical winding;

means defining a cylindrical chamber adjacent said first seat means to enclose said magnetic closure means and to constrain the motion of said magnetic closure means substantially parallel to said axial length, said closure means being at least partially within said axial length and movable between a position against said first seat means and a position displaced therefrom;

means defining a fluid chamber communicating with said fluid passage through said central opening, fluid conduit means having a first and extending from said fluid chamber whereby a differential fluid pressure can be applied between said other end of said fluid passage and the other end of said fluid conduit means;

second annular seat means having an opening aligned with and disposed near said first end of said fluid conduit means to form an effective seal therewith when in said displaced position;

means for accessing the relative pressure in said fluid chamber; and, restriction means in said fluid conduit means restricting the flow therethrough, said restriction means having an effective cross sectional area less than the cross sectional areas of said fluid conduit means and said fluid passage.

24. The electromechanical valve apparatus of claim 23 wherein said restriction means comprises said second annular seat means.

25. The electromechanical valve apparatus of claim 23 wherein said magnetic closure means includes bias means disposed for movement between a position against said second seat means and a position displaced therefrom.

26. The electromechanical valve apparatus of claim 25 wherein said magnetic closure means includes a substantially flat end portion, said bias means comprising said flat end portion of said magnetic closure means.

27. The electromechanical valve apparatus of claim 25 wherein said magnetic closure means includes a generally elongate cup member and a substantially flat disc member disposed generally normal to said cup member, said bias means comprising said flat disc member.

28. An electromechanical valve apparatus, comprising:

an electrical winding having an axial length;

a magnetic flux circuit for said winding defining a flux path comprising a plurality of adjacent magnetic segments, including a generally cylindrical center segment extending over portion of said axial length which defines a fluid passage, an outer segment and an end segment adjacent a first end of said fluid passage, at least one of said segments being physically translatable within said valve apparatus along said flux path to adjust a portion of one of said segments that is in said flux path and the extent of an air gap adjacent the translatable segment;

annular non-magnetic seat means having a central opening aligned with and disposed near the other end of the fluid passage within said axial length;

magnetic closure means comprising one of said segments and positioned adjacent the non-magnetic seat means, said closure means completing the flux path such that fluid flow urged by a predetermined pressure difference through the fluid passage and seat means central opening can be modulated by varying the energization level of the electrical winding, translation of the adjustable segment along said flux path being effective to vary said portion of one of said segments in said flux path and the air gap distance and thus vary the reluctance of the flux circuit, to correspondingly adjust the response of the valve apparatus for a given energization level of the electrical winding to provide a given pressure difference;

means defining a cylindrical chamber adjacent said non-magnetic seat means to enclose said magnetic closure means and to constrain the motion of said magnetic closure means substantially parallel to said axial length, said closure means being at least partially within said axial length and movable between a position against said annular seat means and a position displaced therefrom;

said magnetic closure means being a generally elongate cup means with the end portion thereof adjacent said non-magnetic seat means, said elongate cup means including a substantially flat end member, a generally cylindrical wall member and a base portion, said wall member depending from said end member to said base portion and being constrained by said means defining a cylindrical chamber.

29. The electromechanical valve apparatus of claim 28 wherein said cup means has a portion of said wall member extending beyond said axial length.

30. The electromechanical valve apparatus of claim 28 wherein said wall member includes a substantially flat disc member disposed generally normal to said wall member at said base portion.

31. The electromechanical valve apparatus of claim 30 wherein said cup means base portion includes a series of indentation means adapted to retain said disc member within said cup means base portion.

32. The electromechanical valve apparatus of claim 28 wherein said wall member includes at least one notch portion.

33. The electromechanical valve apparatus of claim 32 wherein a plurality of cup means notch portions define a plurality of leg members.

34. The electromechanical valve apparatus of claim 31 wherein the outlet from said chamber is through said extension whereby said cup means end member forms an effective seal therewith in said displaced position.

35. An electro mechanical valve apparatus, comprising;

an electrical winding;

a magnetic flux circuit magnetically coupled to said winding and defining a flux path, said circuit comprising a plurality of adjacent magnetic segments, including a generally cylindrical center segment which defines a fluid passage, an outer segment and an end segment adjacent an input end of said fluid passage;

an annular non-magnetic seat member, having a central opening aligned with and disposed about the output end of said fluid passage and extending beyond the center member, said opening defining an area for the exertion of pressure;

a magnetic closure member, positioned adjacent the non-magnetic seat member, adapted to substantially cover said central opening;

said center member being physically translatable within said valve apparatus along said flux path to adjust a portion of said center member that is in said flux path and the extent of an air gap between said output end of the center member and said magnetic closure member;

means defining a cylindrical chamber adjacent said non-magnetic seat member to enclose said seat member and at least a portion of said magnetic closure member and to constrain the motion of said magnetic closure member substantially parallel to the longitudinal axis of said fluid passage between a position against said annular seat member and a position displaced therefrom; said cylindrical chamber means including bobbin means to substantially enclose said electrical winding;

said magnetic closure member with said magnetic segments, completing the flux path such that fluid flow urged by a predetermined pressure difference through the fluid passage and seat member central opening can be modulated by varying the energization level of the electrical winding, translation of the center member along said flux path being effective to vary said portion of said center member in said flux path and regulate the air gap distance between said center member and said closure member and thus vary the reluctance of the flux circuit, to correspondingly adjust the response of the valve apparatus for a given energization level of the electrical winding to provide a given pressure difference; and said magnetic closure member being a generally elongate cup member, said elongate cup member including a substantially flat end member, a generally cylindrical wall member and a base portion, said wall member depending from said end member to said base portion.

36. The electromechanical valve apparatus of claim 35 wherein said cup member has a portion of said wall member extending beyond said bobbin means.

37. The electromechanical valve apparatus of claim 35 wherein said wall member includes at least one notch portion.

38. The electromechanical valve apparatus of claim 35 wherein said center member further comprises a plurality of cylindrical portions, including a first end portion and a second end portion, said center member first end portion has slot means therethrough.

* * * * *